(12) United States Patent
Lopez

(10) Patent No.: US 7,212,616 B2
(45) Date of Patent: May 1, 2007

(54) SYSTEM FOR ADAPTING A CONVENTIONAL TELEPHONE LINE TO A DATA AND VOICE TRANSMISSION LOCAL NETWORK

(76) Inventor: Enrique Romero Lopez, Ctra. Dels Vilars, 21, esc. B, atic 2$^{nd}$Edifici Mestral, Escaldes Engordany (AD)

( * ) Notice: Subject to any disclaimer, the term of this patent is extended or adjusted under 35 U.S.C. 154(b) by 0 days.

(21) Appl. No.: 10/507,264

(22) PCT Filed: Feb. 21, 2003

(86) PCT No.: PCT/IB03/00696

§ 371 (c)(1),
(2), (4) Date: Sep. 10, 2004

(87) PCT Pub. No.: WO03/077524

PCT Pub. Date: Sep. 18, 2003

(65) Prior Publication Data

US 2005/0117723 A1    Jun. 2, 2005

(30) Foreign Application Priority Data

Mar. 13, 2002  (ES)  ............................... 200200592

(51) Int. Cl.
*H04M 11/00*   (2006.01)
(52) U.S. Cl. ............................ 379/93.05; 379/106.04; 379/106.08
(58) Field of Classification Search ........... 379/106.04, 379/106.07, 106.08, 106.11, 93.36
See application file for complete search history.

(56) References Cited

U.S. PATENT DOCUMENTS

| | | | |
|---|---|---|---|
| 4,578,536 A | 3/1986 | Oliver et al. | 179/2 AM |
| 4,644,103 A | 2/1987 | Rosenfeld | 379/42 |
| 4,833,618 A | 5/1989 | Verma et al. | 364/483 |
| 5,204,896 A | 4/1993 | Oliver | 379/106 |
| 5,434,911 A | 7/1995 | Gray et al. | 379/106 |
| 5,677,947 A | 10/1997 | Oliver | 379/107 |
| 5,815,558 A * | 9/1998 | Bradley et al. | 379/106.04 |
| 6,347,135 B1 * | 2/2002 | Xia et al. | 379/106.04 |
| 6,690,677 B1 * | 2/2004 | Binder | 379/90.01 |
| 7,003,102 B2 * | 2/2006 | Kiko | 379/90.01 |

* cited by examiner

*Primary Examiner*—Stella Woo
(74) *Attorney, Agent, or Firm*—Wolf Block Schorr & Solis-Cohen LLP

(57) ABSTRACT

The system includes a device (1) for detecting hung up/picked up line, which provides a signal showing whether the line is open or closed, a device (2) for closing or opening the line (7), which provides the data to be transmitted, a device (3) for detecting a conventional call, a module (4) for exterior connection, a power supply circuit (5), which receives electrical current from the telephone line (7) itself and control means (6) which, on receiving a signal through the connection module (4), transmit an appropriate signal to the device (2) for closing and opening the line (7), which transmits the data of a message to be transmitted.

2 Claims, 1 Drawing Sheet

SYSTEM FOR ADAPTING A CONVENTIONAL TELEPHONE LINE TO A DATA AND VOICE TRANSMISSION LOCAL NETWORK

FIELD OF INVENTION

This invention relates to a system for adapting a conventional telephone line to a data and voice transmission local network, which removes the need for a power supply external to the telephone line, but without loss of the characteristics of the line itself.

BACKGROUND OF THE INVENTION

Known in the art are systems for adapting a conventional telephone line to a data and voice transmission local network.

In these systems used in local networks the signals are transmitted through the telephone line by means of transmission devices powered from wiring and a power supply source of their own, galvanically separate from the telephone network.

An infrastructure for electrical power supply is therefore necessary, which doubles the installation and maintenance cost.

For example, if it is wished to connect an appliance alarm system using the telephone network, wiring must at present be installed to bring the electrical current to the data transmitter device which will provide the alarm signal from the appliance to be controlled.

SUMMARY OF THE INVENTION

The system of invention manages to resolve the aforesaid disadvantages.

The system for adapting a conventional telephone line to a data and voice transmission local network, characterised in that it includes a device for detecting hung up/picked up line, which provides a signal showing open or closed line, a device for closing or opening the line, which provides the data to be transmitted, a device for detecting a conventional call, an exterior connection module, a power supply circuit which receives electrical current from the telephone line itself, and control means which on receiving a signal through the connection module, transmit a suitable signal to the device for opening and closing the line, which transmits the message data to be transmitted, while said control means also receive conventional call signals.

The system of the invention uses the electrical power supply from the analogical telephone line itself and does not require an external power supply, which means that it can be fitted on any equipment connected to a same telephonic pair.

The system of the invention, makes good use of the public network infrastructure, that is, buses and power supply, to establish a voice and data communication, without using an external power supply or independent wiring, apart from that of the same telephonic pair installation. Any equipment which uses this technology, can carry out transmission and reception functions.

It is thus not necessary, to duplicate a communication infrastructure, saving money and resources.

Another invention advantage, consists in that it allows to be established a cost-free communication, because it allows to transmit and/or receive a data/orders string, through a telephone line without the need to make a call.

This is so, because the system is based on the fact that the device which must to transmit, takes the line (pick up) and transmits the data by the openings of the line (hang up), during a consecutives fixed periods, without the telephone switchboard recognize any dialling.

The system of the invention can be used on telephones and equipments which are connected to an analogical telephone line, and allows to do a local communication between an equipments unlimited number connected to a same analogical telephonic pair, independently of their location.

Advantageously, the power supply circuit is connected to the telephone line, to the control means, to the detector device hung up/picked up line and to the device for closing or opening the line.

Also advantageously, the invention system uses a communication protocol that allows to discriminate whether the communication received is for the itself equipment fitted with the system or for another one.

The other pieces of equipment connected to the telephonic pair, analyses the hangings up and pickings up taking place on the line, performing the data received and selecting those that pertain to them.

The transmissions are received by all the pieces of equipment, and these marks, thanks to the communication protocol, whether the data are being sent to them or to other equipment. This means that specific transmissions can be made to one, more than one or all the pieces of equipment.

BRIEF DESCRIPTION OF THE DRAWINGS

For a better understanding of all that, has been outlined a sheet of drawings is attached which, schematically and solely by way of non-restrictive example shows a practical case of embodiment.

DETAILED DESCRIPTION OF THE INVENTION

Figure 1:
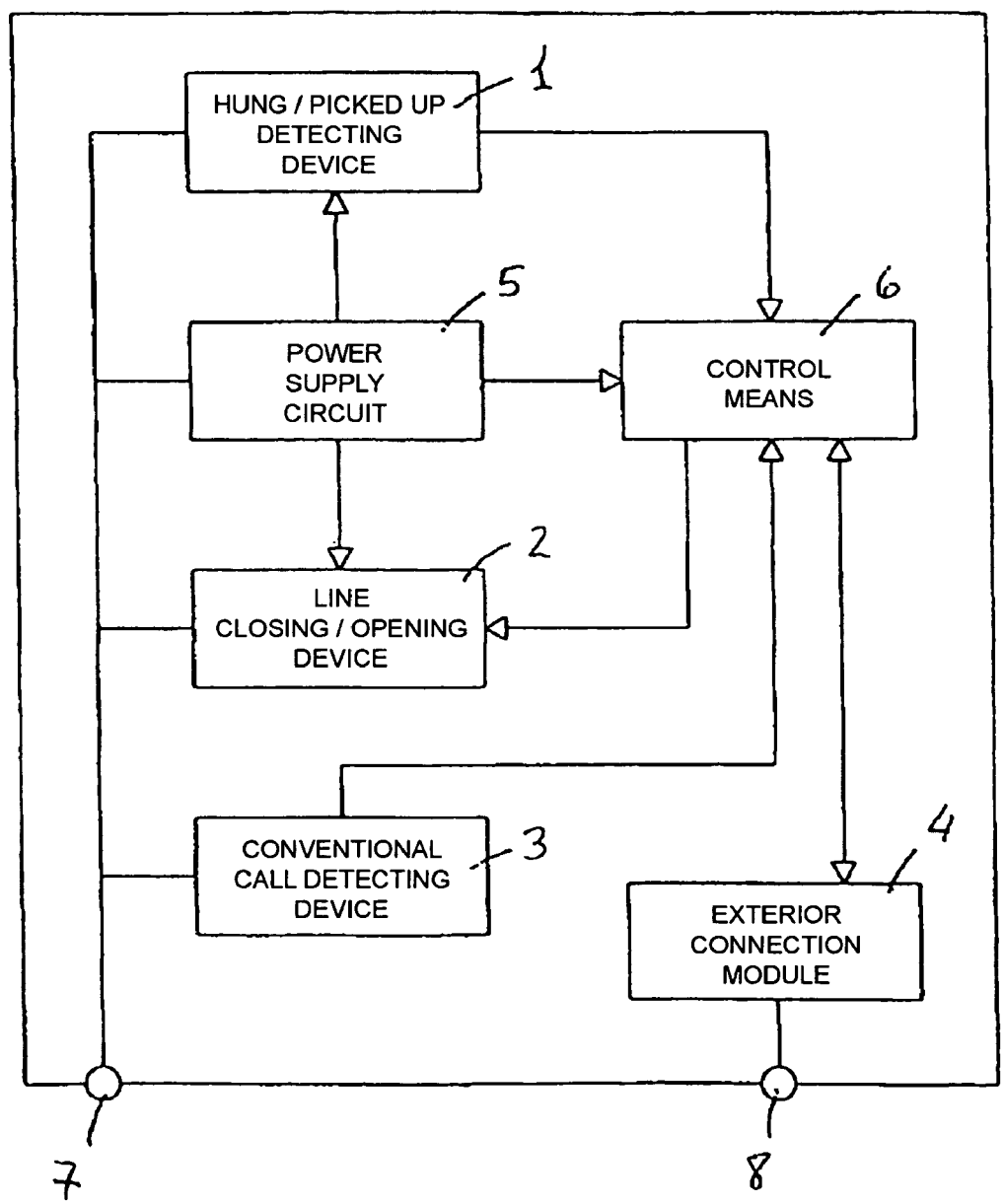
FIG. 1 is a flow chart showing an example of a system for adapting a data and voice transmission local network to an analog telephone line.

As the Figure shows, the system of the invention for adapting a conventional telephone line to a data and voice transmission local network, includes a device 1 for detecting a hung up/picked up line, which provides a signal showing open or closed line, a device 2 for closing or opening the line, which provides that the data to be transmitted, a device 3 for detecting a conventional call, an exterior connection module 4, a power supply circuit 5, which receives electrical current from the telephone line itself and control means 6.

As can be seen, the power supply circuit 5 is connected to the telephone line 7, to the control means 6, to the device 1 for detecting a hung up/picked up line and to the device 2 for closing or opening the line 7.

More specifically, the different blocks shown works as follows:

The hung up/picked up line detector informs the control means 6 (a computer CPU) of the line status; picked up or hung up; the device for closing or opening the line has the function of picking up the line 7 when the system wishes to transmit an order to the other pieces of equipment and send the corresponding codes by means of consecutive openings of variable duration; a conventional call detecting device 3 informs the control means (CPU) 6 when an external call current is received through the telephone line; the exterior connection module 4 makes the connection to other parts of the equipment in which it is located; the power supply circuit

5 obtains from the telephone line the power supply necessary to power the equipment without any need to pick up the line, thereby complying with applicable European and United States regulations; and the control means (CPU) 6 process all the information to be received or transmitted, and allows, through the exterior connection module block, deliver or receiver the orders to be transmitted from an outside equipment 8 which may or may not, to be powered by the telephone line.

What is claimed is:

1. System for adapting a conventional telephone line to a data and voice transmission local network comprising:
    a device (1) for detecting hung up/picked up line, which provides a signal showing open or close line (7);
    a device (2) for closing or opening the line (7), which provides the data to be transmitted;
    a device (3) for detecting a conventional call;
    an exterior connection module (4);
    a power supply circuit (5);
    control means (6);
    and a communication protocol;
    wherein said system uses the electrical power supply and buses from the analogical telephone line (7) itself without using an external power supply or independent wiring,
    said control means (6), which on receiving a signal through the connection module (4) transmit a suitable signal to the device (2) for opening and closing the line (7), which transmits message data to be transmitted, while said control means (6) also receive the conventional call signals,
    allows to transmit control protocol messages during the openings of the line (7) and without the telephone switchboard recognize any dialing, and
    wherein said communication protocol permits local communication with other systems similar to the system described herein and therefore the system may discern whether the communication received is for the equipment fitted with the system itself or for other equipment.

2. The system of claim 1, wherein a network is created by connecting the system to a telephone jack without the need for a gateway module.

* * * * *